US011493165B2

(12) United States Patent
Fitzsimmons et al.

(10) Patent No.: US 11,493,165 B2
(45) Date of Patent: Nov. 8, 2022

(54) MONITOR POSITION ADJUSTMENT BASED ON APPLICATION METADATA (71) Applicant: International Business Machines Corporation, Armonk, NY (US)

(72) Inventors: Thomas D. Fitzsimmons, Elverson, PA (US); Ryan Golden, Pflugerville, TX (US); Zachary Freitas, Hyde Park, NY (US); Troy Flagg, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 16/552,236

(22) Filed: Aug. 27, 2019

(65) Prior Publication Data
US 2021/0062959 A1 Mar. 4, 2021

(51) Int. Cl.
| F16M 11/04 | (2006.01) |
| G06F 16/14 | (2019.01) |
| G06F 1/16 | (2006.01) |
| F16M 11/20 | (2006.01) |
| G05B 13/00 | (2006.01) |
| H04L 65/40 | (2022.01) |

(52) U.S. Cl.
CPC ....... F16M 11/046 (2013.01); F16M 11/2028 (2013.01); G05B 13/00 (2013.01); G06F 1/1622 (2013.01); G06F 16/14 (2019.01); H04L 65/40 (2013.01)

(58) Field of Classification Search
CPC .. F16M 11/046; F16M 11/2028; G06F 16/14; G06F 1/1622; H04L 29/08
USPC ...................................................... 705/7.22
See application file for complete search history.

(56) References Cited

U.S. PATENT DOCUMENTS

| 5,096,271 A | 3/1992 | Portman |
| 5,250,888 A | 10/1993 | Yu |
| 5,607,122 A * | 3/1997 | Hicks ...................... B64C 27/78 244/17.19 |
| 6,655,645 B1 | 12/2003 | Lu et al. |
| 6,741,911 B2 * | 5/2004 | Simmons ................ G06F 3/011 318/568.17 |
| 6,924,792 B1 * | 8/2005 | Jessop .................. G02B 26/004 345/48 |

(Continued)

FOREIGN PATENT DOCUMENTS

WO 2015192653 A1 12/2015

OTHER PUBLICATIONS

Ridden, P., "Motorized mechanism makes onscreen document reading easier on the eyes", Computers, Apr. 10, 2017, 2 pages.

(Continued)

*Primary Examiner* — Tauqir Hussain
(74) *Attorney, Agent, or Firm* — James L. Olsen (57) ABSTRACT

Aspects of the present disclosure relate to automatic monitor position adjustment. An indication that an application is being launched is received. A preferred monitor position for the application is determined by referencing a data store mapping preferred monitor positions to respective metadata attributes, where the preferred monitor position for the application is determined based on the preferred monitor position being mapped to a first metadata attribute associated with the application within the data store. An actuator associated with the monitor is then instructed to adjust the position of the monitor to the preferred monitor position.

20 Claims, 7 Drawing Sheets

(56) References Cited

U.S. PATENT DOCUMENTS

| | | | |
|---|---|---|---|
| 7,406,150 B2 | 7/2008 | Minyard et al. | |
| 7,690,317 B2 | 4/2010 | Beck et al. | |
| 7,969,714 B2* | 6/2011 | Wang | B60R 11/0235 |
| | | | 361/679.04 |
| 9,990,749 B2* | 6/2018 | Kunkel | H04N 5/58 |
| 10,273,910 B1* | 4/2019 | Elias | F02M 26/54 |
| 10,497,162 B2* | 12/2019 | Kunkel | H04N 21/4622 |
| 10,760,728 B1* | 9/2020 | Maalouf | G06F 3/03547 |
| 10,762,809 B1* | 9/2020 | DeLorean | G08G 1/042 |
| 2008/0163461 A1 | 7/2008 | Choi et al. | |
| 2009/0237873 A1 | 9/2009 | Flessas | |
| 2013/0184064 A1* | 7/2013 | Manning | G07F 17/32 |
| | | | 463/32 |
| 2013/0271363 A1* | 10/2013 | Poznansky | G06F 3/03547 |
| | | | 345/156 |
| 2014/0090888 A1* | 4/2014 | Smith | E21B 21/08 |
| | | | 175/38 |
| 2017/0172829 A1* | 6/2017 | Tessmer | A61G 7/0516 |
| 2018/0059528 A1* | 3/2018 | Goeke | H04N 9/3147 |
| 2019/0047715 A1* | 2/2019 | Hedrick | G08G 5/04 |
| 2019/0059173 A1* | 2/2019 | Desmond | H05K 7/1497 |
| 2019/0072231 A1* | 3/2019 | Newville | F16M 13/02 |
| 2020/0090562 A1* | 3/2020 | DeLorean | G09F 19/22 |
| 2020/0110793 A1* | 4/2020 | Sullivan | G06F 40/106 |
| 2020/0138200 A1* | 5/2020 | Sharma | A47C 21/044 |
| 2020/0255109 A1* | 8/2020 | Chan | B63B 79/40 |
| 2020/0289721 A1* | 9/2020 | Qu | G16H 40/63 |
| 2020/0312150 A1* | 10/2020 | Wang | G08G 1/166 |
| 2021/0120149 A1* | 4/2021 | Jauss | H04N 9/68 |
| 2021/0174714 A1* | 6/2021 | DeLorean | G09F 21/04 |
| 2021/0233442 A1* | 7/2021 | DeLorean | G09F 27/005 |
| 2021/0334547 A1* | 10/2021 | Cohen-Tidhar | G06F 16/7837 |
| 2022/0134877 A1* | 5/2022 | Larry | B60R 11/02 |
| | | | 701/1 |

OTHER PUBLICATIONS

Mell et al., "The NIST Definition of Cloud Computing", Recommendations of the National Institute of Standards and Technology, Sep. 2011, 7 pages.

Davis, M., "Build an Automatic Computer Display Rotator With an Arduino", All About Circuits, Apr. 12, 2016, 20 pages, <https://www.allaboutcircuits.com/projects/build-an-automatic-computer-display-rotator-with-an-arduino/>.

Kevin, "Rotating monitor for arcade cabinet", Pololu Blog, Jun. 16, 2011, 2 pages <https://www.pololu.com/blog/148/rotating-monitor-for-arcade-cabinet>.

* cited by examiner

MONITOR POSITION ADJUSTMENT BASED ON APPLICATION METADATA

BACKGROUND

The present disclosure relates to display technology, and more specifically, to monitor position adjustment.

Monitors are output devices that display images. Types of monitors include cathode ray tube (CRT) monitors, liquid crystal display (LCD) monitors, and organic light-emitting diode (OLED) monitors. LCD monitor types include twisted nematic (TN), vertical alignment (VA), in-plane switching (IPS), and quantum dot monitors. The type of display technology affects characteristics of the monitor. For example, monitor characteristics such as luminance, resolution, color depth, gamut, refresh rate, response time, Delta-E, and viewing angle can depend on the underlying technology within the monitor.

SUMMARY

Aspects of the present disclosure relate to a computer-implemented method, system, and computer program product for automatic monitor position adjustment. An indication that an application is being launched can be received. A preferred monitor position for the application can be determined by referencing a data store mapping preferring monitor positions to respective metadata attributes, where the preferred monitor position for the application is determined based on the preferred monitor position being mapped to a first metadata attribute associated with the application within the data store. An actuator associated with the monitor can then be instructed to adjust the position of the monitor to the preferred monitor position.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward display technology, and in particular, to monitor position adjustment. While the present disclosure is not necessarily limited to such applications, various aspects of the present disclosure may be appreciated through a discussion of various examples using this context.

When using a monitor, the monitor's ideal position can differ for different tasks. For example, websites and text-based applications may be best viewed while the monitor is in a vertical orientation (e.g., portrait mode), while videos and/or video games may be best viewed while the monitor is in a horizontal orientation (e.g., landscape mode). Though existing monitor mounts/stands can manually rotate to accommodate a variety of positions, the process of manually adjusting the position of the monitor (e.g., physically and electronically on the display) can be time consuming and tedious. For example, if a user frequently transitions from portrait to landscape mode, not only are they required to physically rotate their monitor to the preferred orientation each time, but they may also be required to select the preferred orientation option within the operating system (OS). This negatively impacts usability of monitors.

Aspects of the present disclosure relate to automatic monitor position adjustment based on application metadata. An indication that an application is being launched can be received. A preferred monitor position for the application can be determined by referencing a data store mapping preferred monitor positions to respective metadata attributes. An actuator associated with the monitor can then be instructed to adjust the position of the monitor to the preferred monitor position.

Figure 1:
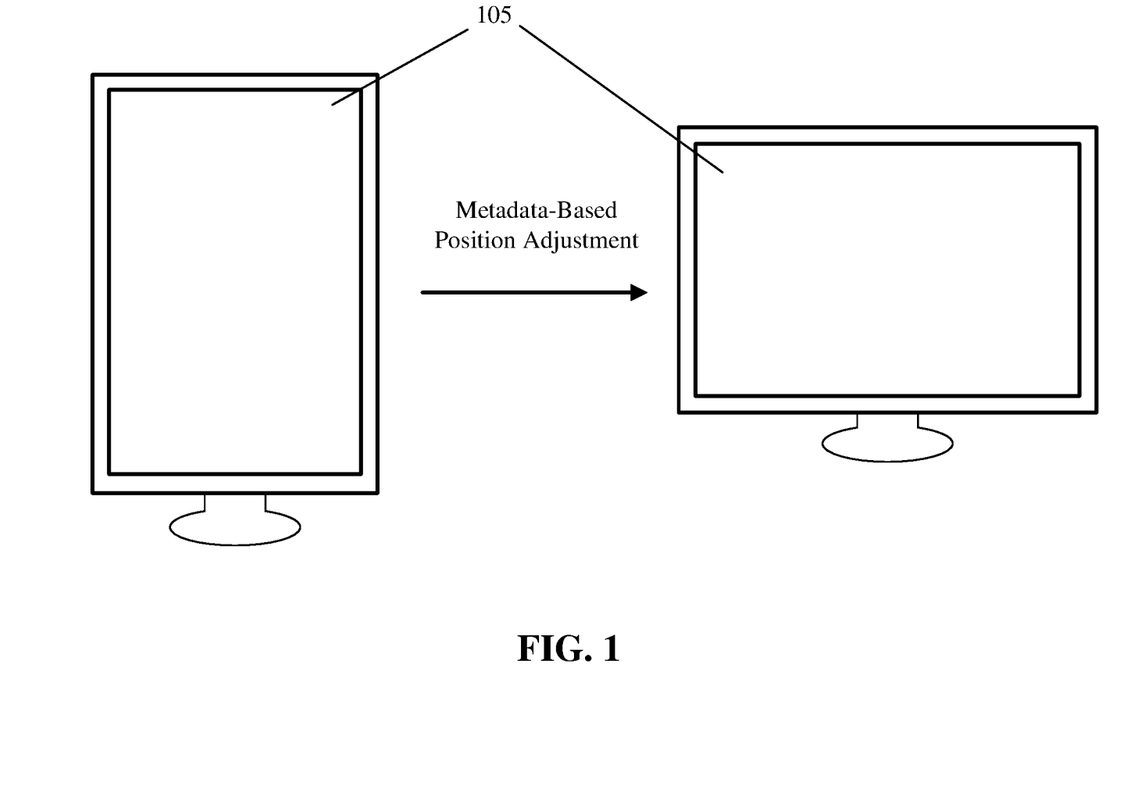
FIG. 1 illustrates a monitor adjusting from a first position to a second position based on application metadata, in accordance with embodiments of the present disclosure.

Referring now to FIG. 1, shown is a diagram of a monitor 105 transitioning from a first position to a second position, in accordance with embodiments of the present disclosure.

Conventional monitors may be manually rotatable such that they can be viewed in portrait (vertical orientation) mode or landscape (horizontal orientation) mode. However, the user is tasked with physically and electronically executing this task. For example, per the physical position adjustment, the user may be required to adjust the vertical height of the monitor and thereafter rotate the monitor to the preferred orientation. Per the electronic position adjustment, the user may be required to select an option within an operating system, display management application, or other location such that the display data is output according to the preferred orientation. For example, a user can navigate an OS menu "Screen Resolution" and alter the orientation within an "Orientation" tab. This ensures that the image data is output according to the physical orientation of the monitor. Manually executing these tasks is tedious, especially when performed on a frequent basis.

Aspects of the present disclosure enable automatic monitor position adjustment based on metadata. Based on the observance of particular metadata attributes (e.g., a program name, file format, application category, time, date, author, etc.), a preferred monitor position adjustment can be determined. The position of the monitor can then be automatically adjusted by one or more actuators (e.g., motors) within the monitor 105. In embodiments, the actuators can be located within the monitor stand/mount. As depicted in FIG. 1, the monitor 150 starts in a vertical orientation and is adjusted to a horizontal orientation based on observed metadata.

Automatically adjusting the position of the monitor improves the usability of monitors. For example, a user is no longer tasked with physically rotating the monitor and electronically adjusting the display according to the physical orientation. Further, by adjusting the position based on metadata, monitor adjustments can be made automatically in a variety of situations. For example, the orientation of the monitor 150 can be adjusted based on the particular application that is launched and/or the category of application that is launched (e.g., a video game vs. text document). This enables automatic position adjustments, for example, when a user transitions between applications.

As discussed herein, a "position adjustment" can refer to an alteration of a physical position of the monitor. The position adjustment can occur along any suitable degree of freedom available to the monitor. For example, a position adjustment can specify an orientation adjustment, a horizontal position adjustment (moving the monitor left or right), a vertical position adjustment (moving the monitor up or down), and/or an angular adjustment (tipping the monitor forwards or backwards). In embodiments, a position adjustment can be accompanied with an electronic adjustment of the display (e.g., an alteration to the pixel data displayed on the monitor). For example, an electronic adjustment of the display can include a resolution alteration or an orientation shift.

Metadata associated with an application that can be analyzed to determine a preferred monitor position can include any suitable metadata, including descriptive metadata (e.g., title, subject, category, author, creation date, publisher, etc.), legal metadata (e.g., copyright status, license information, etc.), technical metadata (e.g., file types, file size, creation/installation date and time, compression information, etc.), and others.

Figure 2:
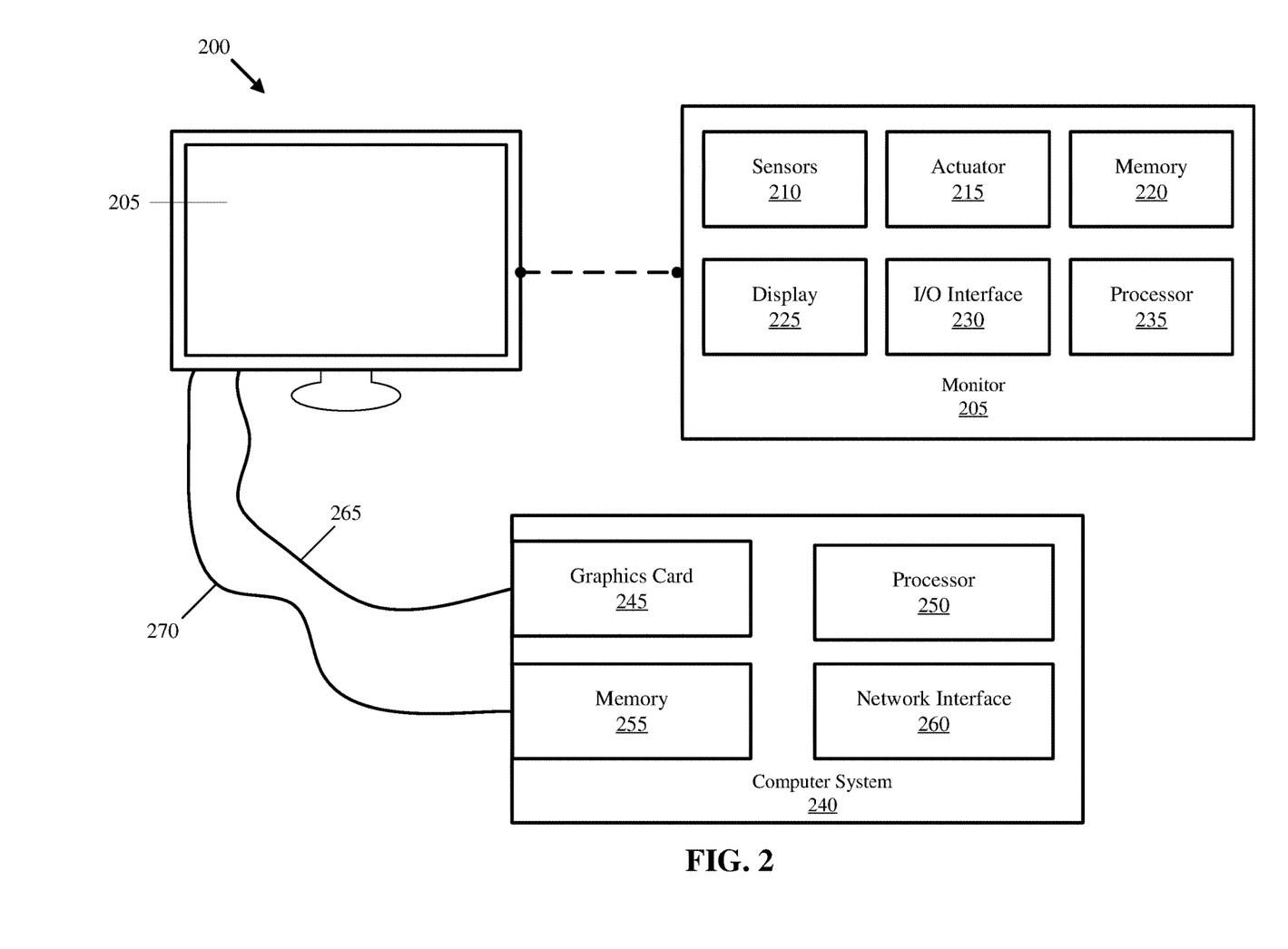
FIG. 2 illustrates a computing environment in which illustrative embodiments of the present disclosure can be implemented.

FIG. 2 is a block diagram illustrating a computing environment 200 in which illustrative embodiments of the present disclosure can be implemented. The computing environment 200 includes a monitor 205 communicatively coupled to a computer system 240. Components of the monitor 205 are depicted to the right of the monitor 205 (connected by a dashed line). The monitor can include sensors 210, an actuator 215, a memory 220, a display 225, an input/output (I/O) interface 230, and a processor 235. The computer system can include a graphics card 245, a processor 250, a memory 255, and a network interface 260. For brevity, only a handful of potential components of the monitor 205 and computer system 240 are depicted. Aspects of the present disclosure recognize that additional components may be present in both the monitor 205 and computer system 240. For example, both the monitor 205 and computer system 240 can each include a power supply (not shown).

The monitor 205 and computer system 240 can be communicatively coupled in any suitable manner. For example, as depicted in FIG. 2, a video cable 265 communicatively links a graphics card 245 of the computer system to an I/O interface 230 of the monitor 205. This enables the transmission of video data (e.g., data dictating the state of pixels) between the graphics card 245 and monitor 205. The monitor 205 can also be communicatively coupled to the computer system 240 using a networking cable 270. This enables the transmission of data (e.g., application data) between the monitor 205 and computer system 240, for example, to enable position adjustments to be issued by the monitor 205.

Any suitable video cable 265 can be implemented, including, but not limited to, video graphics array (VGA) cables, digital visual interface (DVI) cables, high definition multimedia interface (HDMI) cables, universal serial bus (USB) (e.g., USB 2.0, USB 3.0, etc.) cables, and display port (DP) cables. Further, any suitable networking cable 270 can be implemented, including USB cables, Ethernet cables, optical fiber cables, and others. In embodiments, data can be transmitted between the computer system 240 and monitor 205 using a wireless link (not shown). For example, data can be transmitted between the monitor 205 and computer system 240 using Wi-Fi, Bluetooth, radiofrequency identification (RFID), and others. Wireless data exchange can occur between the computer system 240 and monitor 205 through the network interface 260 of the computer system 240 and a network interface of the monitor (not shown).

The display 225 of the monitor can be configured to display image data. The display 225 can utilize any suitable display technology, including, but not limited to, LCD, LED, or OLED technology. In embodiments, the display 225 can include a touch screen utilizing touchscreen technology including, but not limited to, capacitive, resistive, or surface acoustic waves. The graphics card 245 may be operatively coupled to the display 225 to control what is visually displayed on the display 225. In embodiments, the graphics card 245 can be integrated (e.g., built into a motherboard (not shown) of the computer system 240) or can alternatively be a discrete component (e.g., plugged into a motherboard of the computer system 240 via a peripheral component interconnect (PCI) express port). In embodiments, the characteristics of the monitor, such as luminance, resolution, color depth, gamut, refresh rate, response time, Delta-E, and viewing angle, can depend on the underlying technology display technology (e.g., OLED vs. LCD). In embodiments, the output of image data (e.g., the displayed frames per second, the resolution, etc.) can depend on the type of graphics card 245 operatively coupled to the monitor 205.

The sensors 210 of the monitor 205 can be configured to collect data such that the movement range of the monitor can be determined. This can be completed such that a determination can be made whether the orientation of the monitor can be adjusted (without colliding with obstructions). Any suitable sensors can be used to determine a movement range of the monitor. For example, optical sensors (e.g., photoelectric sensors, laser sensors, passive thermal infrared sensors, cameras, photocell sensors, etc.), ultrasonic sensors, magnetic sensors, and capacitive sensors can be used to determine the movement range of the monitor 205. In embodiments, upon initiation of the monitor 205, the movement range is initially determined (e.g., via scanning by the sensors 210) such that proper monitor position adjustments can be made.

In addition, the sensors 210 can collect data which can be used to detect obstructions during a readjustment. For example, if the environment surrounding the monitor 205 (e.g., a desk, office space, etc.) has changed since a movement range of the monitor was determined, the sensors 210 can be configured to detect collisions with nearby objects during a readjustment. This can be completed such that, if an obstruction exists, the monitor 205 can be rotated back to its previous position, thereby preventing potential damage to the monitor 205. Sensors 210 used to detect collisions can include tactile sensors (e.g., pressure sensor arrays and strain gauges) and force sensors (e.g., force sensing resistors).

In embodiments, the sensors 210 can be integrated with the monitor 205. For example, the sensors 210 can be attached to the monitor 205 and can be configured to collect spatial data surrounding the monitor 205. In some embodiments, the sensors 210 can be remotely located from the monitor 205 and can be configured to view the area surrounding the monitor 210 and transmit the sensor data over a network (e.g., not shown) to the monitor 205. For example, the sensors 210 can include one or more cameras viewing the monitor from a distance to detect potential obstructions. In some embodiments, the sensors 210 can be detachably (removably) coupled to the monitor 205, such that they can be communicatively coupled with the monitor 205 as needed.

The actuator 215 of the monitor 205 can be configured to adjust a position (e.g., orientation, angle, height, horizontal position, etc.) of the monitor 205. This can be completed in response to a command given by the processor 235 of the monitor and/or a command given by the processor 250 of the computer system 205. In embodiments, the determination to adjust a position of the monitor 205 is completed based on a metadata analysis. For example, in response to a particular application being launched, metadata attributes of that application can be analyzed to determine a preferred position of the monitor 205 for the application. In embodiments, a data store (stored in either memory 220 of the monitor 205 or memory 255 of the computer system 240) mapping monitor positions to metadata attributes can be referenced to determine a preferred position of the monitor. For example, if a data store maps a particular metadata category "Gaming" to a preferred orientation "Landscape," then the actuator 215 can be configured to orient the monitor horizontally in response to an application having a metadata category "Gaming" being launched. Further, a processor (e.g., processor 235 or processor 250) can be configured to electronically alter the orientation of the monitor 205 to the "Landscape" orientation.

The actuator 215 can include any suitable technology configured to adjust a position of the monitor 205. In embodiments, the actuator 215 can be hydraulic, pneumatic, electric (e.g., a motor), thermal, magnetic, mechanical, or any combination thereof. In embodiments, the monitor 205 can include a plurality of actuators (e.g., multiple actuators 215) configured to control the movement of the monitor 215 along different degrees of freedom available to the monitor. For example, a first actuator can be responsible for altering a height of the monitor while a second actuator can be responsible for altering an orientation of the monitor. However, any suitable number, type, and/or configuration of actuators operable to adjust a position of the monitor 205 can be implemented.

In some embodiments, the processor 235 of the monitor 205 is configured to determine whether a position adjustment is required. This can be completed by receiving application data from the computer system 240 (e.g., through the video cable 265, networking cable 270, or network interface 260) and referencing a data store mapping preferred orientations to metadata attributes within the memory 220 of the monitor 205. For example, in response to launching a text-based application on the computer system 240, metadata associated with the text-based application can be transmitted to the monitor 205. The processor 235 of the monitor can then be configured to reference (e.g., compare) the metadata associated with the text-based application with a data store mapping preferred monitor positions to metadata attributes (e.g., stored within memory 220 of the monitor 205). Based on the comparison, the processor 235 can determine whether a position adjustment is required, and what the position adjustment entails (e.g., the vertical, horizontal, or angular shift of the monitor). The processor 235 can then transmit the position adjustment to the actuator 215 such that the position adjustment can be executed.

In some embodiments, the processor 250 of the computer system 240 is configured to determine whether a position adjustment is required. This can be completed by comparing application metadata (e.g., upon an application launch) to a data store mapping preferred monitor positions to metadata attributes (e.g., stored within memory 255 of the computer system 240). The processor 250 can then transmit an indication of whether a position adjustment is required and/or what the position adjustment entails to the monitor 205 (e.g., through the video cable 265, networking cable 270 and/or network interface 260). The actuator 215 can then execute the position adjustment issued by the processor 250.

Reference will now be made to Table 1, presented below, depicting an example data store mapping metadata attributes to preferred monitor positions, in accordance with embodiments of the present disclosure.

TABLE 1

| Metadata Attribute | Position |
| --- | --- |
| Application Name 1 | Landscape |
| Application Name 2 | Portrait |
| Application Name 3 | Position 1 |
| Category 1 | Landscape |
| Category 2 | Position 2 |
| Publisher 1 | Portrait |
| Publisher 2 | Position 3 |

As depicted in Table 1, various metadata attributes can be mapped to various monitor positions. This data store can be stored within memory 220 of the monitor 205 (and analyzed by processor 235 of the monitor 205) and/or within memory 255 of the computer system 240 (and analyzed by processor 250 of the computer system 240). The metadata attributes depicted in Table 1 include three distinct application names, two distinct application categories, and two distinct application publishers. These metadata attributes are mapped to specific monitor positions. For example, the first application name is mapped to a landscape position (e.g., the monitor is horizontally oriented), the second application name is mapped to a portrait position (e.g., the monitor is vertically oriented), the third application name is mapped to a first monitor position (specifying a first height, horizontal position, and/or angle of the monitor 205), etc.

Upon launching an application, the metadata attributes of the application can be analyzed to determine the preferred position in the "Position" column in Table 1. This preferred position can then be transmitted to the actuator 215 such that the monitor position can be adjusted per the appropriate "Position".

In embodiments, metadata attributes can be mapped to preferred positions via user input. That is, a user can explicitly map a particular metadata attribute to a particular monitor position. For example, referencing Table 1, a user can specify that "Category 1" should be associated with a portrait mode instead of a landscape mode. In this example, the user can alter (e.g., via a graphical user interface (GUI)) the monitor position corresponding to "Category 1" from "Landscape" to "Portrait." In some embodiments, metadata attributes can be assigned a default monitor position. Thereafter, a user can adjust the monitor position to metadata attribute mappings as needed.

In embodiments, positions (specifying height, horizontal position, and/or angle of the monitor 205) can be manually set by a user. For example, a user can manually adjust the position of their monitor and position data (stored within memory 220 of the monitor 205) indicating the height, horizontal position, and/or angle of the monitor 205 set by the user can be mapped to a metadata attribute.

FIG. 2 is intended to represent the major components of an example computing environment 200 according to embodiments of the present disclosure. In some embodiments, however, individual components can have greater or lesser complexity than shown in FIG. 2, and components other than, or in addition to those shown in FIG. 2 can be present. Furthermore, in some embodiments, various components illustrated in FIG. 2 can have greater, lesser, or different functionality than shown in FIG. 2. Further still, aspects of the present disclosure exist comprising only a subset of the components illustrated while remaining within the spirit and scope of the present disclosure.

Figure 3:
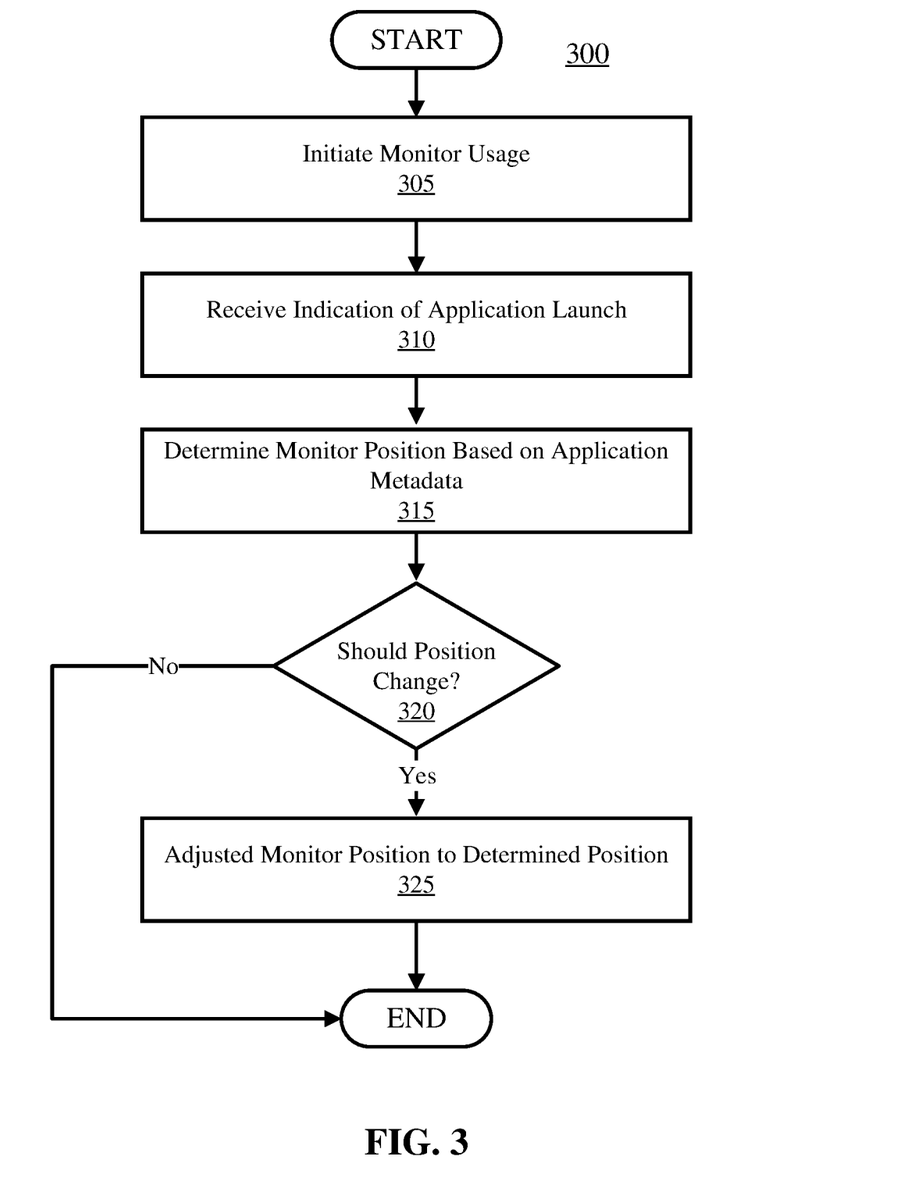
FIG. 3 is a flow diagram illustrating an example method for adjusting a monitor position based on application metadata, in accordance with embodiments of the present disclosure.

Referring now to FIG. 3, shown is a flow diagram illustrating an example method 300 for adjusting a monitor position based on application metadata, in accordance with embodiments of the present disclosure.

Method 300 initiates at operation 305, where monitor use is initiated. The monitor can be initiated by powering on a computer system (e.g., computer system 240 of FIG. 2) communicatively coupled to the monitor (e.g., monitor 205 of FIG. 2). In some embodiments, the monitor is initiated by powering on, plugging in, or otherwise activating the monitor.

An indication of an application launch is then received. This is illustrated at operation 310. Initiating an application can be completed by launching a shortcut icon or executable file (e.g., an .exe file) associated with an application. Accordingly, an indication of an application launch can be received in response to an application being launched. In some embodiments, an operating system can be referenced to determine running processes on a computer system to determine whether an application is launched (e.g., via a task manager). In embodiments, the indication of the application being launched can be transmitted from a computer system to a monitor using a networking cable (e.g., networking cable 270 of FIG. 2) or wireless link.

A preferred position of the monitor is then determined based on metadata associated with the application. This is illustrated at operation 315. This can be completed by referencing a data store mapping preferred monitor positions to metadata attributes. Accordingly, in response to identifying a particular metadata attribute associated with the application within the data store, a preferred position of the monitor can be determined. An example data store mapping preferred monitor positions to metadata attributes is depicted in Table 1, discussed above.

The comparison between the datastore mapping preferred monitor positions to metadata attributes and the application metadata can be completed using a matching algorithm, such as a string matching algorithm (e.g., Knuth-Morris-Pratt, Rabin-Karp, Boyer-Moore, and Naïve string-search). As an example, an application can be parsed for any metadata attributes located within the datastore using a matching algorithm. If a metadata attribute located within the datastore is located using the matching algorithm, then the preferred position is determined based on the preferred position indicated in the datastore.

In some embodiments, if no metadata attributes associated with the application are referenced within the data store, a user can be prompted to revise the data store. This can include the user appending an additional metadata attribute to monitor position mapping for the application to the data store. For example, assume a particular application, "Application Z," is launched and there are no mappings of metadata attributes within "Application Z" to any preferred monitor positions. In this example, the user can map the name (or any other metadata attribute, such as the publisher name, category, time, date, etc.) of "Application Z" to a particular monitor position (e.g., Landscape Mode). In some embodiments, the user can manually adjust the monitor to the preferred position (e.g., by physically and/or electronically adjusting the display) and map the manually adjusted position to a metadata attribute associated with the unmapped application.

In some embodiments, if two contradictory monitor positions are identified for a particular application, a user can be prompted to select an appropriate monitor position. For example, assume that, for a particular application, "Application X," a category "Web Browser" indicates that "Application X" should be in the vertical orientation. Further, assume that an application name "Browser X" indicates that "Application X" should be in the horizontal orientation. In this example, the user can be notified regarding the contradiction. Further, the user can be prompted to correct the contradiction by specifying the preferred position for the monitor.

A determination is then made whether the monitor position should change. This is illustrated at operation 320. The determination whether the monitor position should change is completed by comparing the current monitor position (e.g., landscape mode) to the preferred monitor position (e.g., vertical mode). If the current monitor position differs from the preferred monitor position, then a determination is made that the monitor position should change. If the current monitor position is the same as the preferred position, then a determination is made that the monitor position should not change.

If a determination is made that the monitor position should not change, then method 300 ends, as the monitor is already in the preferred position. If a determination is made that the monitor position should be changed, then the monitor position is adjusted to the preferred monitor position. This is illustrated at operation 325. The monitor position can be adjusted by one or more actuators (e.g., actuator 215 of FIG. 2) within the monitor. In embodiments, adjusting the monitor position can include altering a height, horizontal position, viewing angle, and/or orientation of the monitor.

The aforementioned operations can be completed in any practical order and are not limited to those described. Additionally, some, all, or none of the aforementioned operations can be completed, while still remaining within the spirit and scope of the present disclosure.

Figure 4:
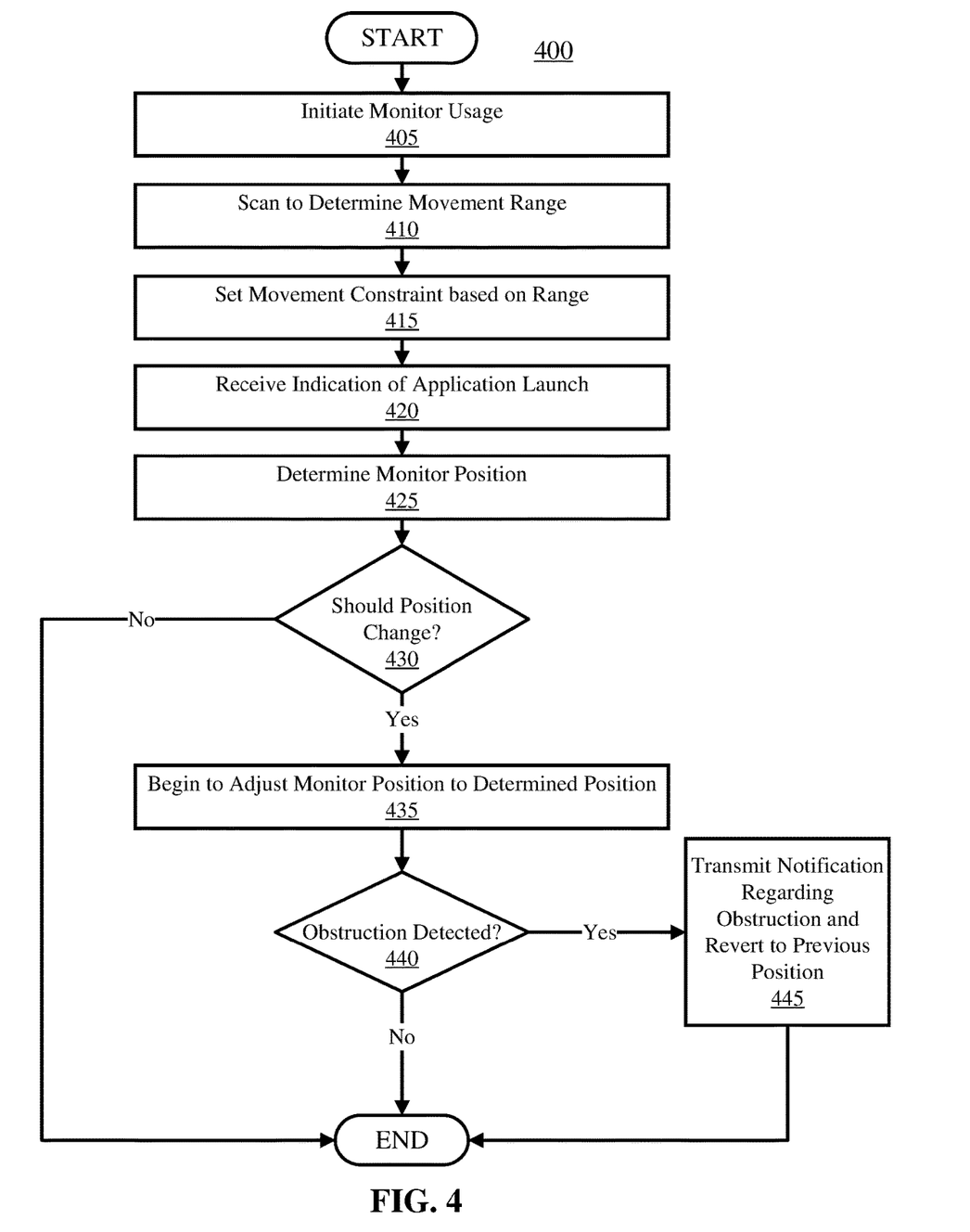
FIG. 4 is a flow diagram illustrating another example method for adjusting a monitor position based on application metadata, in accordance with embodiments of the present disclosure.

Referring now to FIG. 4, shown is a flow diagram illustrating an example method 400 for adjusting a monitor position based on application metadata, in accordance with embodiments of the present disclosure.

Method 400 initiates at operation 405, where monitor use is initiated. The monitor can be initiated by powering on a computer system (e.g., computer system 240 of FIG. 2) communicatively coupled to the monitor (e.g., monitor 205 of FIG. 2). In some embodiments, the monitor is initiated by powering on, plugging in, or otherwise activating the monitor.

Scanning is then performed to determine a movement range of the monitor. This is illustrated at operation 410. Scanning can be performed by one or more sensors (e.g., sensors 210 of FIG. 2) associated with the monitor. For example, an optical scanner can be configured to collect visual data such that potential obstructions along degrees of freedom of the monitor can be identified.

In embodiments, multiple sensors can be implemented such that each sensor can collect spatial data associated with a particular degree of freedom. For example, a first sensor can be placed on a left side of a monitor to detect a leftward movement range (xl), a second sensor can be placed on a rightward side of the monitor to detect a right movement range (xr), a third sensor can be place on top of the monitor to detect an upward movement range (yu), and a fourth sensor can be placed on the bottom of the monitor to detect a downward movement range (yd). The movement range for the monitor can then be defined based on xl, xr, yu, and, yd. This can similarly be implemented for angular degrees of freedom.

A movement constraint is then set based on the movement range determined at operation 410. This is illustrated at operation 415. Following the example above, the movement constraint would be set according to xl, xr, yu, and, yd. The movement constraint prevents the monitor from transitioning to a position where the monitor may collide with nearby objects (as detected by the sensors). For example, if a determination is made to transition from a first monitor position to second monitor position, if the second monitor position violates the movement constraint (e.g., is outside the permitted movement range), the monitor adjustment can be prevented. This can prevent collision damage to the monitor. In some embodiments, a warning can be transmitted in response to determining that a preferred monitor position violates a movement constraint. This can allow users to clear the area such that the permitted movement range can be expanded to include the preferred monitor position.

An indication of an application launch is then received. This is illustrated at operation 420. The indication of the application launch can be received in the same, or a substantially similar, manner as described with respect to operation 310 of FIG. 3.

A monitor position is then determined based on metadata associated with the application. This is illustrated at operation 425. Determining the monitor position based on metadata associated with the application can be completed in the same, or a substantially similar, manner as described with respect to operation 315 of FIG. 3. For example, the monitor position can be determined by referencing a data store mapping metadata attributes to preferred monitor positions.

A determination is then made whether the monitor position should change. This is illustrated at operation 430. The determination whether the monitor position should change is completed by comparing the current monitor position to the preferred monitor position. If the current monitor position differs from the preferred monitor position, then a determination is made that the monitor position should change. If the current monitor position is the same as the preferred monitor position, then a determination is made that the monitor position should not change.

If a determination is made that the monitor position should not change, then method 400 ends, as the monitor is already in the preferred position. If a determination is made that the monitor position should change, then the position of the monitor is adjusted. This is illustrated at operation 435. The monitor can be adjusted by one or more actuators (integrated within the stand or mount of the monitor) in response to a command provided by a processor (e.g., of the monitor or computer system). While the monitor is adjusted, a determination is made whether there is an obstruction detected. This is illustrated at operation 440. Obstructions can be detected using tactile sensors (e.g., pressure sensor arrays and strain gauges) and/or force sensors (e.g., force sensing resistors) associated with the monitor.

If an obstruction is not detected while the position of the monitor is being adjusted, then method 400 ends, as the monitor completes its movement without collision. If an obstruction is detected while the position of the monitor is being adjusted, then method 400 proceeds to operation 445, where a notification regarding the obstruction is transmitted and the position of the monitor is reverted to its previous position. The notification can be displayed on a display (e.g., display 225 of FIG. 2) of the monitor and can indicate that an obstruction was detected during the position change. Upon reverting the monitor's position to its previous position, method 400 terminates.

The aforementioned operations can be completed in any order and are not limited to those described. Additionally, some, all, or none of the aforementioned operations can be completed, while still remaining within the spirit and scope of the present disclosure. For example, in some embodiments, operations 410 and 415 can be reorganized to occur or reoccur between operations 430 and 435 to obtain a more contemporaneous analysis of the environment around the monitor (for example, to see if an object was recently placed near the monitor that was not there before operation 430).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
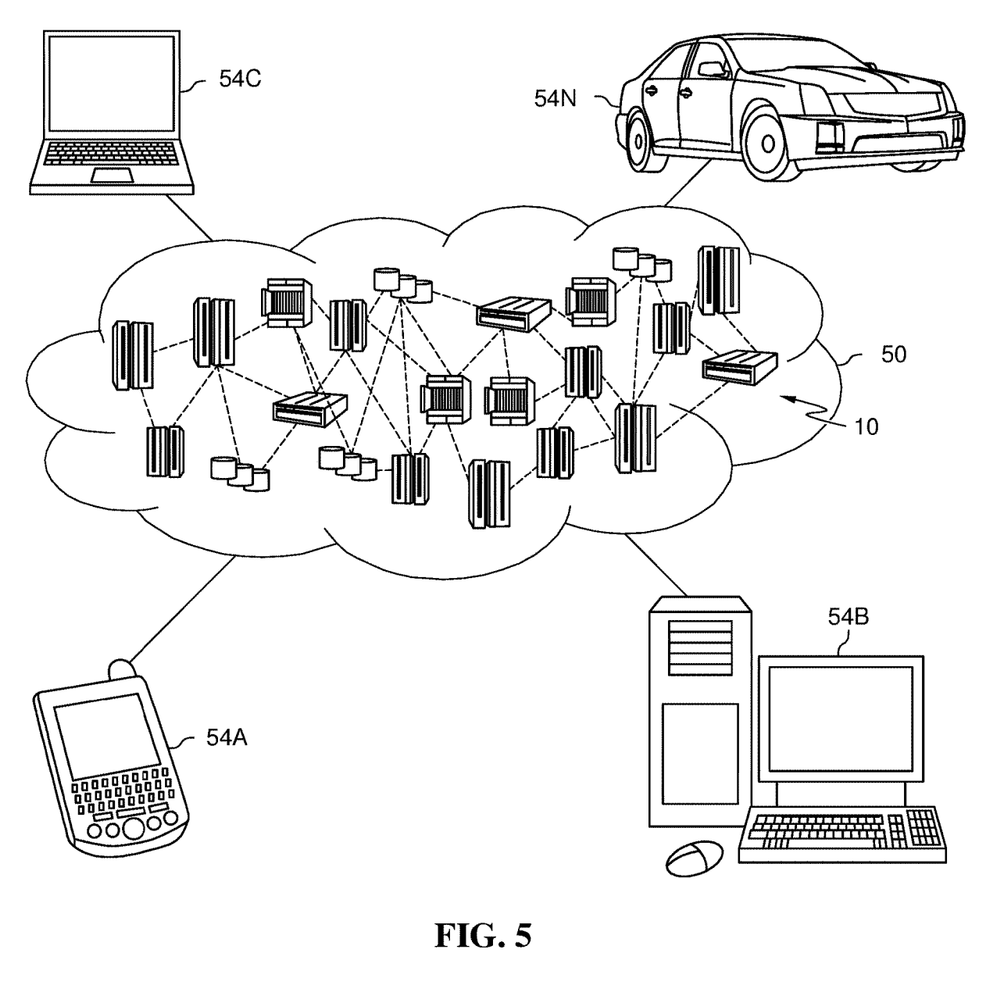
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B (e.g., computer system 240 of FIG. 2), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
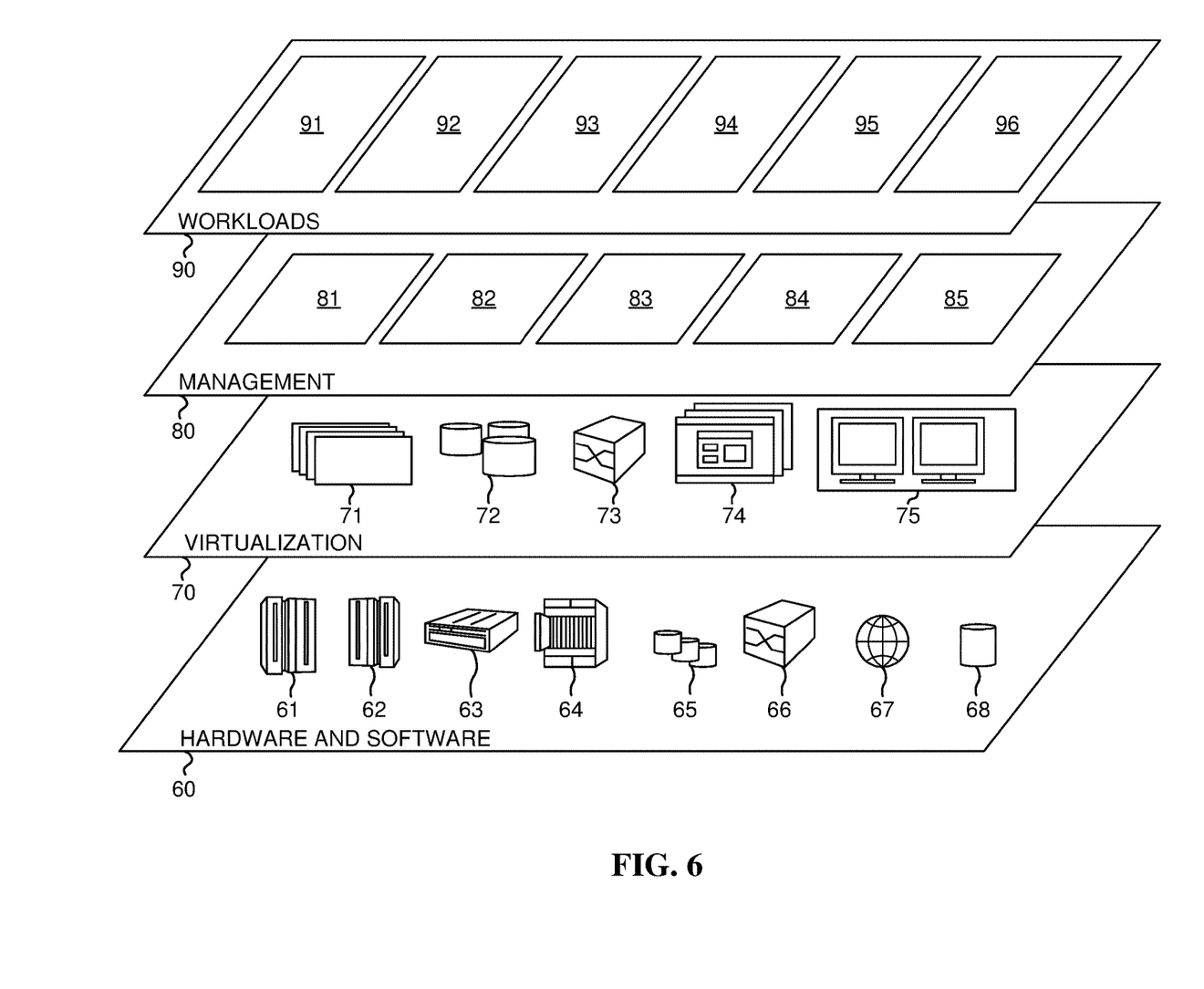
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and monitor position adjustment 96.

Figure 7:
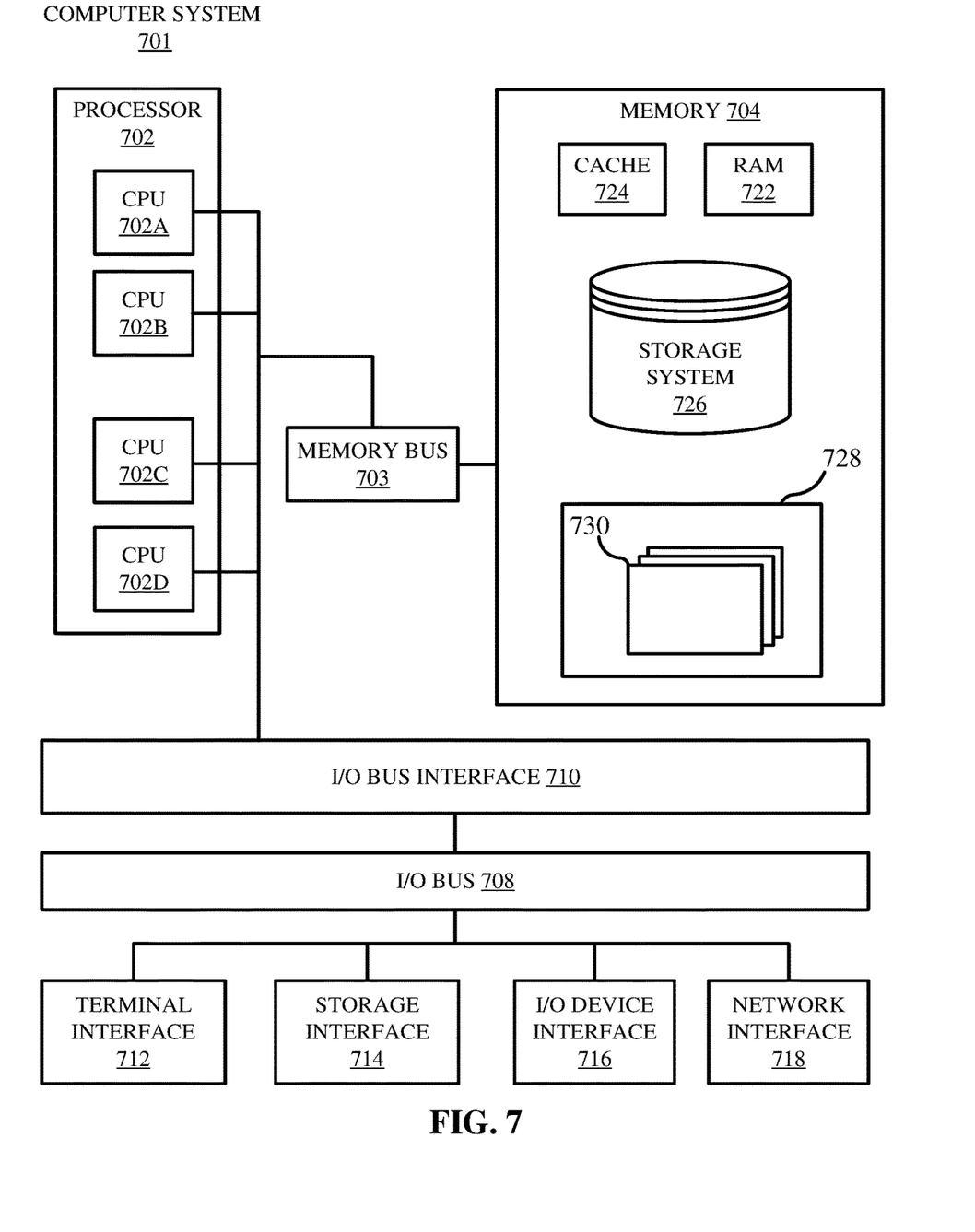
FIG. 7 is a high-level block diagram illustrating an example computer system that may be used in implementing one or more of the methods, tools, and modules, and any related functions described herein, in accordance with embodiments of the present disclosure.

Referring now to FIG. 7, shown is a high-level block diagram of an example computer system 701 that may possibly be utilized in various devices discussed herein (e.g., computer system 240) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

In some embodiments, the program modules 730 of the computer system 701 may include a monitor position adjustment module. The monitor position adjustment module can be configured to receive an indication that an application is being launched. In response to determining that the application is being launched, the monitor position adjustment module can be configured to determine a preferred monitor position for the application by referencing a data store mapping preferred monitor positions to respective metadata attributes, where the preferred monitor position for the application is determined based on a first monitor position being mapped to a first metadata attribute associated with the application within the data store. The monitor position adjustment module can then be configured to transmit a command to an actuator associated with the monitor specifying that the position of the monitor should be adjusted to the first monitor position.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
receiving an indication that an application is being launched;
determining, responsive to the indication, a preferred monitor position for the application by referencing a table mapping preferred monitor positions to respective metadata attributes, wherein the preferred monitor position for the application is determined based on the preferred monitor position being mapped to a first metadata attribute associated with the application within the table;
determining a positional adjustment of the monitor based on a current position of the monitor and the preferred monitor position; and
instructing an actuator associated with the monitor to perform the positional adjustment to adjust the current position of the monitor to the preferred monitor position.

2. The method of claim 1, further comprising:
receiving an indication that a second application is being launched;
referencing the table to determine a second preferred monitor position for the second application based on the second preferred monitor position being mapped to a second metadata attribute associated with the second application within the table;
determining a second positional adjustment of the monitor based on the preferred monitor position for the application and the second preferred monitor position for the second application; and
instructing the actuator associated with the monitor to perform the second positional adjustment to adjust the preferred monitor position for the application of the monitor to the second preferred monitor position for the second application.

3. The method of claim 1, wherein upon initiating use of the monitor, a movement range of the monitor is determined by at least one sensor associated with the monitor.

4. The method of claim 3, wherein the at least one sensor includes a first sensor configured to determine a leftward movement range of the monitor, wherein the at least one sensor includes a second sensor configured to determine a rightward movement range of the monitor, wherein the at least one sensor includes a third sensor configured to determine an upward movement range of the monitor, wherein the at least one sensor includes a fourth sensor configured to determine a downward movement range of the monitor.

5. The method of claim 1, wherein a tactile sensor or force sensor is configured to determine whether an obstruction exists while the actuator adjusts the current position of the monitor to the preferred monitor position.

6. The method of claim 1, wherein the first metadata attribute is an application name, and wherein the preferred monitor position is a portrait mode orientation.

7. The method of claim 1, wherein the first metadata attribute is an application category, and wherein the preferred monitor position is a landscape mode orientation.

8. A system comprising:
a memory storing a table mapping preferred monitor positions to respective metadata attributes and program instructions; and
a processor configured to execute the program instructions to perform a method comprising:
receiving an indication that an application is being launched;
determining, responsive to the indication, a preferred monitor position for the application by referencing the table, wherein the preferred monitor position for the application is determined based on the preferred monitor position being mapped to a first metadata attribute associated with the application within the table;
determining a positional adjustment of the monitor based on a current position of the monitor and the preferred monitor position; and
instructing an actuator associated with the monitor to perform the positional adjustment to adjust the current position of the monitor to the preferred monitor position.

9. The system of claim 8, wherein the method performed by the processor further comprises:
receiving an indication that a second application is being launched;
referencing the table to determine a second preferred monitor position for the second application based on the second preferred monitor position being mapped to a second metadata attribute associated with the second application within the table;

determining a second positional adjustment of the monitor based on the preferred monitor position for the application and the second preferred monitor position for the second application; and instructing the actuator associated with the monitor to perform the second positional adjustment to adjust the preferred monitor position for the application of the monitor to the second preferred monitor position for the second application.

10. The system of claim 8, wherein upon initiating use of the monitor, a movement range of the monitor is determined by at least one sensor associated with the monitor.

11. The system of claim 8, wherein the at least one sensor includes a first sensor configured to determine a height range of the monitor, wherein the at least one sensor includes a second sensor configured to determine an angular range of the monitor.

12. The system of claim 8, wherein a tactile sensor or force sensor is configured to determine whether an obstruction exists while the actuator adjusts the current position of the monitor to the preferred monitor position.

13. The system of claim 12, wherein in response to the tactile sensor or force sensor determining that the obstruction exists while performing the positional adjustment, the actuator reverts the monitor to its previous position.

14. The system of claim 8, wherein the first metadata attribute is an application publisher, wherein the preferred monitor position is a portrait mode orientation.

15. A computer program product comprising a computer readable storage medium having program instructions embodied therewith, wherein the computer readable storage medium is not a transitory signal per se, the program instructions executable by a processor to cause the processor to perform a method comprising:

receiving an indication that an application is being launched;

determining, responsive to the indication, a preferred monitor position for the application by referencing a table mapping preferred monitor positions to respective metadata attributes, wherein the preferred monitor position for the application is determined based on the preferred monitor position being mapped to a first metadata attribute associated with the application within the table;

determining a positional adjustment of the monitor based on a current position of the monitor and the preferred monitor position; and instructing an actuator associated with the monitor to perform the positional adjustment to adjust the current position of the monitor to the preferred monitor position.

16. The computer program product of claim 15, wherein the method performed by the processor further comprises:

receiving an indication that a second application is being launched;

referencing the table to determine a second preferred monitor position for the second application based on the second preferred monitor position being mapped to a second metadata attribute associated with the second application within the table;

determining a second positional adjustment of the monitor based on the preferred monitor position for the application and the second preferred monitor position for the second application; and instructing the actuator associated with the monitor to perform the second positional adjustment to adjust the preferred monitor position for the application of the monitor to the second preferred monitor position for the second application.

17. The computer program product of claim 15, wherein upon initiating use of the monitor, a movement range of the monitor is determined by at least one sensor associated with the monitor.

18. The computer program product of claim 15, wherein a tactile sensor or force sensor is configured to determine whether an obstruction exists while the actuator adjusts the current position of the monitor to the preferred monitor position.

19. The computer program product of claim 18, wherein in response to the tactile sensor or force sensor determining that the obstruction exists while performing the positional adjustment, the actuator reverts the monitor to its previous position.

20. The computer program product of claim 15, wherein the first metadata attribute is an application name, wherein the preferred monitor position is a landscape mode orientation.

* * * * *